(12) United States Patent
D'Heureuse et al.

(10) Patent No.: US 10,009,267 B2
(45) Date of Patent: Jun. 26, 2018

(54) METHOD AND SYSTEM FOR CONTROLLING AN UNDERLYING PHYSICAL NETWORK BY A SOFTWARE DEFINED NETWORK

(71) Applicant: NEC EUROPE LTD., Heidelberg (DE)

(72) Inventors: Nico D'Heureuse, Heidelberg (DE); Peer Hasselmeyer, Frankfurt (DE); Thomas Dietz, Weingarten (DE); Fabian Schneider, Heidelberg-Bahnstadt (DE); Marcus Schoeller, Kronau (DE); Sibylle Schaller, Mannheim (DE)

(73) Assignee: NEC CORPORATION, Tokyo (JP)

( * ) Notice: Subject to any disclaimer, the term of this patent is extended or adjusted under 35 U.S.C. 154(b) by 186 days.

(21) Appl. No.: 14/775,731

(22) PCT Filed: Mar. 13, 2013

(86) PCT No.: PCT/EP2013/055171
§ 371 (c)(1),
(2) Date: Sep. 14, 2015

(87) PCT Pub. No.: WO2014/139564
PCT Pub. Date: Sep. 18, 2014

(65) Prior Publication Data
US 2016/0043941 A1 Feb. 11, 2016

(51) Int. Cl.
*H04L 12/715* (2013.01)
*H04L 12/24* (2006.01)
*H04L 12/761* (2013.01)

(52) U.S. Cl.
CPC .............. *H04L 45/64* (2013.01); *H04L 41/00* (2013.01); *H04L 41/0896* (2013.01); *H04L 45/16* (2013.01)

(58) Field of Classification Search
CPC ..... H04L 41/00; H04B 1/0035; H04B 1/0003; H04W 36/0066
See application file for complete search history.

(56) References Cited

U.S. PATENT DOCUMENTS 9,246,702 B1 * 1/2016 Sharma ............... H04L 12/2896
2003/0189921 A1 10/2003 Handel
(Continued)

FOREIGN PATENT DOCUMENTS

WO WO 0221856 A2 3/2002

OTHER PUBLICATIONS

Li Erran Li et al: "Toward Software-Defined Cellular Networks", software defined networking (EWSDN), 2012 European Workshop on, IEEE, Oct. 25, 2012 (Oct. 25, 2012), pp. 7-12, XP032283462.

*Primary Examiner* — Omer S Mian
(74) *Attorney, Agent, or Firm* — Leydig, Voit & Mayer, Ltd.

(57) ABSTRACT

A method for controlling an underlying physical network by a software defined network includes providing a physical network that comprises routers for routing data traffic on a data communication plane, providing a software defined network that comprises at least one controller and at least one feature on a control plane for controlling the data forwarding elements of the physical network, communicating, by the data forwarding elements of the data communication plane, with the controller of the control plane on a dedicated control channel, communicating, by the controller, with the at least one feature on a dedicated feature channel in the control plane, and exchanging, via the data communication plane, at least a portion of the data traffic in the control plane.

13 Claims, 5 Drawing Sheets

(56) References Cited

U.S. PATENT DOCUMENTS

| | | | |
|---|---|---|---|
| 2013/0058215 A1* | 3/2013 | Koponen | H04L 12/4633 |
| | | | 370/241 |
| 2014/0003232 A1* | 1/2014 | Guichard | H04L 67/16 |
| | | | 370/230 |
| 2014/0192645 A1* | 7/2014 | Zhang | H04L 47/12 |
| | | | 370/235 |

* cited by examiner

METHOD AND SYSTEM FOR CONTROLLING AN UNDERLYING PHYSICAL NETWORK BY A SOFTWARE DEFINED NETWORK

CROSS REFERENCE TO RELATED APPLICATIONS

This application is a U.S. National Phase application under 35 U.S.C. § 371 of International Application No. PCT/EP2013/055171, filed on Mar. 13, 2013. The international application was published in English on Sep. 18, 2014, as WO 2014/139564 A1 under PCT Article 21(2).

FIELD

The present invention relates to a method for controlling an underlying physical network by a software defined network, wherein the physical network comprises data forwarding elements for routing data traffic on a data communication plane.

BACKGROUND

Software defined networks are a form of a physical network virtualization in which the control plane, i.e. a communication plane for controlling the physical network is separated from a data communication plane. This enables disjoint tasks of physical network control and data transport via the physical network.

More specifically in a software defined network, abbreviated with SDN, a router for routing data traffic is controlled for example via an external control element usually called network operating system or simply controller. The controller instructs the router or the routers of the network, for example switches, of their tasks, i.e. what to do with which data packet. So called (network) features—sometimes also called network apps—are built on top of the controller and implement network logic and functionality, for example routing. A dedicated control channel is used for exchanging control traffic between the controller and the routers.

However, such a software defined network has some disadvantages. One of the disadvantages is, that the control channel between the data plane and the control plane has usually a limited capacity both in terms of bandwidth and in terms of CPU utilization of the controller and in particular also on routers. A further disadvantage is, that the interoperability with networks other than software defined networks or networks under control of a different controller is difficult, since different network control protocols have to be emulated by a feature. This means that control data packets for these (legacy) protocols have to be sent to the responsible feature via the dedicated control channel. This requires an encapsulation of the original control packets for the legacy protocol into a SDN control packet. The feature then takes appropriate actions and eventually is also sending packets out through the network via the dedicated control channel. This also needs bandwidth and CPU resources. For example: For each type of a legacy control packet the controller inserts corresponding rules into the switches with assigning the output port for these packets being the controller. The router thus encapsulates those legacy control packets into SDN control packets and sends them to the controller via the dedicated control channel. The controller then extracts the legacy control packets and uses these legacy control packets to update its internal routing state and to reconfigure the routers accordingly if necessary. Depending on the respective legacy control protocol, the controller sends legacy control packets back into the network.

SUMMARY

In an embodiment, the present invention provides a method for controlling an underlying physical network by a software defined network, wherein the physical network comprises routers for routing data traffic on a data communication plane, and wherein the software defined network comprises at least one controller and at least one feature on a control plane for controlling the data forwarding elements of the physical network. The method comprises communicating, by the data forwarding elements of the data communication plane, with the controller of the control plane on a dedicated control channel; communicating, by the controller, with the at least one feature on a dedicated feature channel in the control plane; and exchanging, via the data communication plane, at least a portion of the data traffic in the control plane.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An embodiment of the present invention provides a method and a system for controlling an underlying physical network by a software defined network which reduces load on the control channel.

An embodiment of the present invention provides a method and a system for controlling an underlying physical network by a software defined network with improved scalability.

An embodiment of the present invention provides a method and a system for controlling an underlying physical network by a software defined network enabling an easy migration and/or an easy implementation in currently existing software defined networks.

In an embodiment, the physical network comprises data forwarding elements, preferably routers, for routing data traffic on a data communication plane and wherein the software defined network comprises at least one controller and at least one feature on a control plane for controlling the data forwarding elements of the physical network, and wherein the data forwarding elements of the data communication plane communicate with the controller of the control plane on a dedicated control channel and wherein the controller communicates with the feature on a dedicated feature channel in the control plane In an embodiment, the present invention relates further to a system for controlling an underlying physical network by a software defined network, wherein the physical network comprises data forwarding elements, preferably routers, for routing data traffic on a data communication plane and wherein the software defined network comprises at least one controller and at least one feature on a control plane for controlling the data forwarding elements of the physical network by control information, and wherein the data forwarding elements of the data communication plane are operable to communicate with the controller of the control plane on a dedicated control channel and wherein the controller is operable to communicate with the feature on a dedicated feature channel in the control plane.

In an embodiment, a method is provided for controlling an underlying physical network by a software defined network, wherein the physical network comprises data forwarding elements, preferably routers, for routing data traffic on a data communication plane and wherein the software defined network comprises at least one controller and at least one feature on a control plane for controlling the data forwarding elements of the physical network, and wherein the data forwarding elements of the data communication plane communicate with the controller of the control plane on a dedicated control channel and wherein the controller communicates with the feature on a dedicated feature channel in the control plane.

In an embodiment, the method is characterized in that at least part of the data traffic in the control plane is exchanged via the data communication plane.

In an embodiment, a system is provided for controlling an underlying physical network by a software defined network, wherein the physical network comprises data forwarding elements, preferably routers, for routing data traffic on a data communication plane and wherein the software defined network comprises at least one controller and at least one feature on a control plane for controlling the data forwarding elements of the physical network by control information, and wherein the data forwarding elements of the data communication plane are operable to communicate with the controller of the control plane on a dedicated control channel and wherein the controller is operable to communicate with the feature on a dedicated feature channel in the control plane.

In an embodiment, the system is characterized in that the features and the data forwarding elements are operable to exchange at least part of the data traffic of the control plane via the data communication plane.

In an embodiment, by exchanging at least part of the data traffic in the control plane via the data communication plane the control channel load is significantly reduced, in particular in terms of CPU load on the data forwarding elements, the CPU load on the controller and/or the control channel bandwidth. Reduced control channel load is also achieved by the at least partly offloading of packet sending and/or creation of tasks from the controller to the data forwarding elements. The corresponding packets are then sent via a data forwarding element data path connection.

In an embodiment, an easier integration of non-software defined network control features in software defined network implementations is enabled.

In an embodiment, scalability by spreading processing and transmission load is improved and enables and easier migrations from legacy networks to software defined networks.

An embodiment of the present invention differs in particular from BGP route reflectors. A BGP route reflector only reflects messages that it receives from other BGP speakers and is therefore not a central control element as the feature of a software defined network. Each iBGP speaker needs to process the messages and compute its own routing topology. Therefore a BGP route reflector does not correspond to a feature or to a controller as mentioned in the present invention. If compared with IP sec tunneling according to RFC 4301, IP sec is in particular not a software defined network nor provides similar functionality. In particular IP sec tunnels are statically configured to route IKE traffic according to RFC 4306 to a local IKE instance. Communication between IKE and the security policy data base is implemented indirectly only as IP sec tunneling will check any packet processing against the security policy data base for correctness.

Prior art non patent literature "Outsourcing network and functionality or features" which is available under "stanford.edu/~hyzeng/paper/waypoints" describes that a central controller is used to route traffic through the network and corresponding policies are used to route traffic of a certain pattern to network services. However, the network services are inserted within the user-data path. As an example wireless detection, load balancing, network address translation, webcaching, etc. are described. This is completely different to an embodiment of the present invention since an embodiment of the present invention is related to control traffic of existing network control protocols and does not touch user traffic. Further, the network services do not cooperate for control together, i.e. there is no feedback from the network services to the controller.

According to a preferred embodiment control information for the data forwarding element is exchanged directly between the features and the data forwarding elements on the data communication plane. This enables more easier handling of non-software defined network control protocols, i.e. legacy control protocols: Control packets of legacy control protocols are no longer need to be transmitted over the limited control channel and not via the controller, but may be sent to the feature directly via the high-bandwidth data network.

According to a further preferred embodiment the at least one controller and the at least one feature are collocated at the same entity in the physical network. Updates and/or modifications to the feature or to the controller may be input into only one single entity, therefore providing a very easy update and/or modification procedure.

According to a further preferred embodiment the at least one controller and/or the at least one feature are distributed on different entities of the physical network. Features and/or the controller could be deployed at different physical locations, for example different servers than the rest of the control providing redundancy and distributed load. Of course there could however be multiple features connected to multiple controllers which then have to be synchronized. Corresponding data forwarding elements have then a connection to one or multiple control instances respectively controllers.

According to a further preferred embodiment the open flow protocol is used as SDN control protocol for controlling the data forwarding elements by the software defined network. Using the open flow protocol provides a reliable and easy implementation of software defined networks. For example a software defined network is a so-called open flow network when for each type of control packet the open flow controller inserts appropriate rules in the open flow data forwarding elements, i.e. open flow switches, with the output ports for these packets being the open flow controller. The open flow switch thus encapsulates legacy control packets in open flow control packets and sets them to the open flow controller via the open flow secure channel as a PACKET-IN message. The open flow controller uses then the received packets to update its internal state and potentially to reconfigure the open flow switches. Furthermore, depending on the respective legacy control protocol the open flow controller sends legacy control packets into the network as PACKET-OUT messages, for example responses to incoming requests, keep-alive-messages or the like.

According to a further preferred embodiment the software defined network, preferably a feature, identifies forwarding information for a legacy protocol and instructs the data forwarding elements to forward in control traffic for the legacy protocol directly to the features. This for example removes the need to encapsulate legacy control protocol packets relieving the CPU of the data forwarding elements from that work. Since the feature can be connected to any port of any data forwarding element a location of the functional implementation is independent of the ingress/egress ports of the actual legacy control packets. Legacy control packets may arrive or be sent from any network port.

According to a further preferred embodiment the forwarding information is encoded into unused headers of the legacy control packets of the legacy protocol and/or further headers of the legacy control packets are generated to include the forwarding information. With the use of unused headers and/or by adding further headers the forwarding information could be implemented in a simple way without having to somehow transmit the forwarding information separately. For example, unused header fields may be destination MAC address; further headers may be for example a MPLS header.

According to a further preferred embodiment forwarding information is removed from the legacy control packets prior to arrival of the legacy control packets at the feature. This enables to provide the legacy control packets in the original form so that the feature can evaluate or process the legacy control packets in a very efficient way.

According to a further preferred embodiment unicast and/or multicast legacy protocols, preferably in form of BGP, PIM, ARP, STP and/or IGMP, are emulated by the feature. This enhances the flexibility of the method, in particular of the feature since unicast and/or multicast legacy protocols can be emulated respectively processed by the feature efficiently.

According to a further preferred embodiment at least two features are provided, an incoming feature and an outgoing feature, wherein the incoming feature is only receiving data control traffic and instructs the outgoing feature to output data control traffic based on the receiving data control traffic. This further enhances the flexibility of the method, respectively the corresponding features, since for example tasks which require for example only outgoing data control traffic, for example keep-alive packets, are handled by one or more outgoing features, reducing the required load for the incoming feature. Further this separation of incoming and outgoing features enable an easier distribution of features to different physical entities, for example by taking into account their physical characteristics like CPU power or the like.

Figure 1:
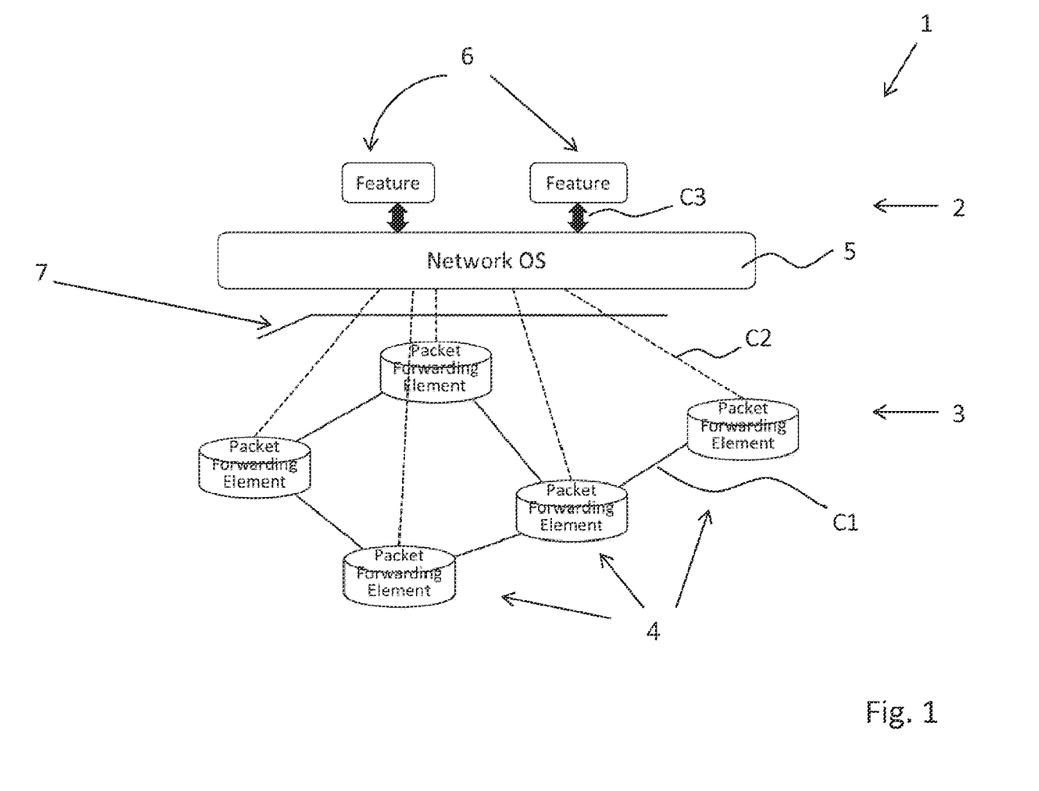
FIG. 1 depicts schematically a conventional system.

FIG. 1 shows schematically a conventional system. In FIG. 1 a conventional software defined network 2 to control an underlying physical network 3 is shown. The physical network 3 comprises packet forwarding elements 4 which are connected in the data communication plane via connections C1. Such a packet forwarding element 4 is a network element that receives network data on one interface and potentially sends them out on another interface. The packet forwarding elements 4 are located in the data communication plane of the physical network 3. The packet forwarding elements 4 usually contain only a basic forwarding logic, which is programmed by the software defined network 2.

The software defined network 2 comprises a network operating system NOS 5, which is also named in the following as controller. The network operating system NOS 5 communicates and programs the forwarding logic within the packet forwarding elements 4. For this the network operating system NOS 5 or controller provides a so-called south-bound interface (connections C2) towards the packet forwarding elements 4 and a north-bound interface (connections) C3 towards one or more features 6. This means that the controller 5 abstracts the implementation of the packet forwarding elements 4 from the feature 6. The feature 6 can be built agnostic to the design of the packet forwarding elements 4. The controller 5 translates the result of a feature 6 into a network configuration and installs it on the respective packet forwarding element 4. Features 6 are applications or processes that implement a certain networking logic protocol of the control plane, for example topology discovery, routing, resource reservation, etc. which also includes an emulation of legacy control protocols, i.e. control protocols other than the protocol used for the system 1.

Figure 2:
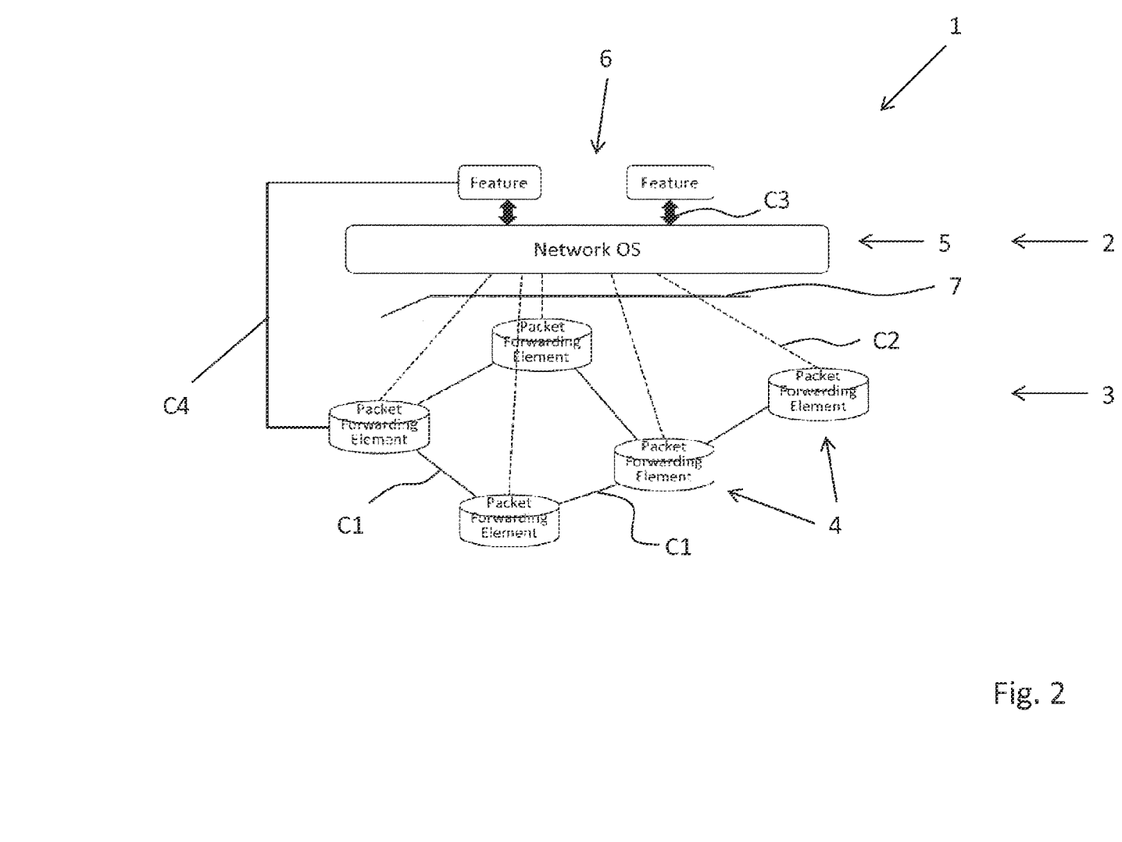
FIG. 2 depicts schematically a system according to a first embodiment of the present invention.

FIG. 2 shows schematically a system according to a first embodiment of the present invention. In FIG. 2 is shown basically a system 1 according to FIG. 1. However, in FIG. 2 one of the two features (the left feature) has a direct connection C4 to one of the packet forwarding elements 4. In FIG. 2 the connection C4 is on the data plane and directly to the feature 6. However, a further connection can be alternatively or additionally be established from the packet forwarding elements 4 to the network operating system or controller 5 in the usual way.

Figure 3:
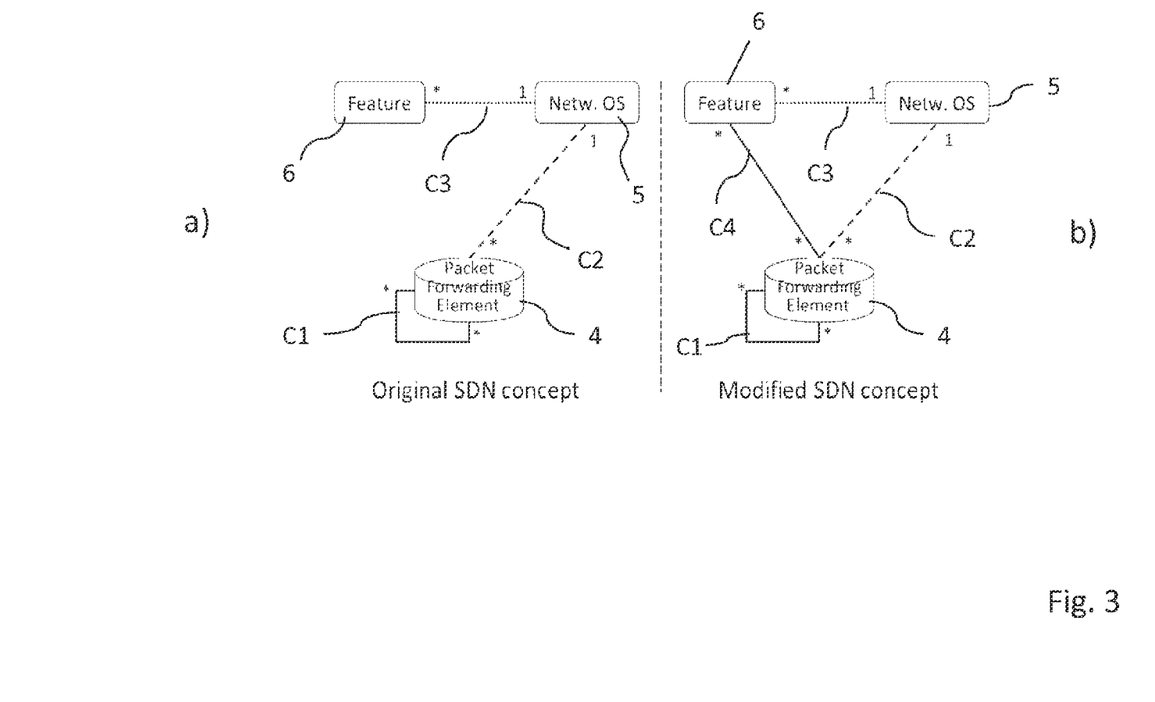
FIG. 3a and FIG. 3b depict a comparison of a conventional system and a system according to a second embodiment of the present invention.

FIG. 3a, 3b show a comparison of a conventional system and a system according to a second embodiment of the present invention. In FIG. 3 is again shown a conventional software defined network, whereas in FIG. 3b the software defined network 2 for a system 1 according to a second embodiment of the present invention is shown. The feature 6 in FIG. 3b now communicates via the data network, i.e. via connection C4. This means that the features 6 now exchange feature data and feature control information directly with the packet forwarding elements 4. With this direct connection C4, the data communication plane packets of legacy control protocols or future non-software defined network control protocols no longer need to be transmitted over the usually limited control channel C2, respectively C3 but may be sent to the corresponding feature 6 directly via the usually high-bandwidth data network.

The controller 5 instructs the packet forwarding elements 4 to forward the legacy control packets along the data path via the connection C4 to the feature 6. This might for example be implemented by modifying a control table in one or more packet forwarding elements 4. Therefore this enables the same routing over one or more packet forwarding elements 4 towards their destination for "normal" data packets as well as for the legacy control packets.

Figure 4:
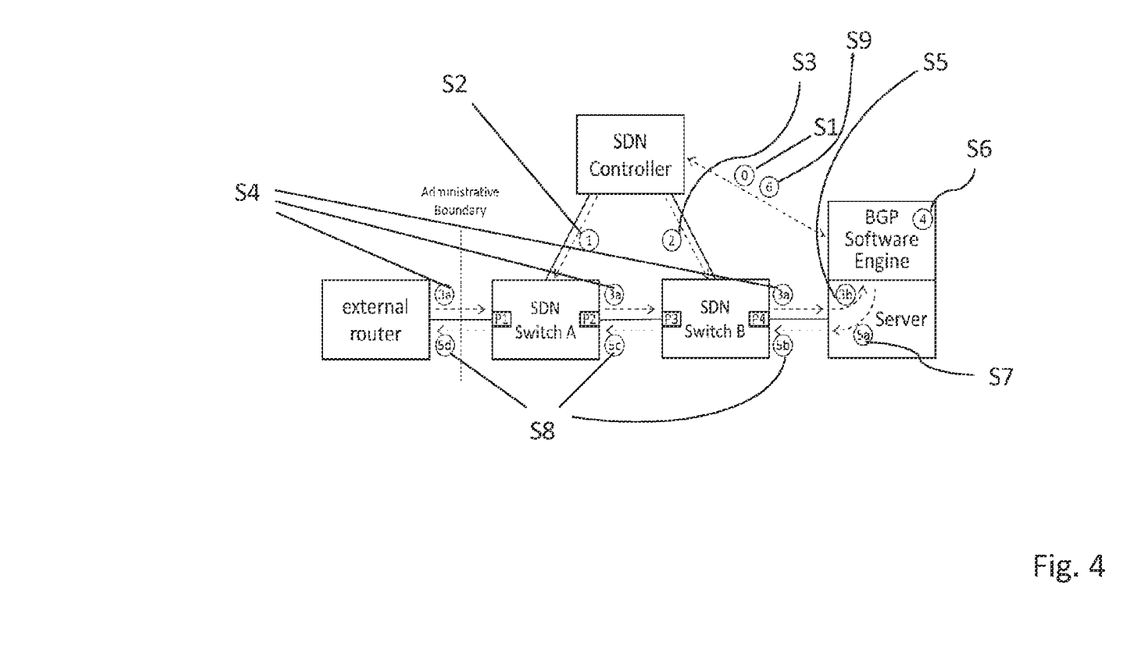
FIG. 4 depicts a system according to a third embodiment of the present invention.

FIG. 4 shows a system according to a third embodiment of the present invention. In FIG. 4 a system and a method according to the invention for the BGP protocol according to RFC 4271 is shown. The software defined network 2 comprises corresponding switches A, B, a server, on which a BGP software engine is running as well as a software defined network controller corresponding to the controller 5 in FIG. 2. The software defined network 2 is connected to a non-software defined network, represented by an external router on the left side of FIG. 4. The BGP protocol is used to communicate IP routing information between (these two) networks. The BGP software engine is—similar to FIG. 2, now the corresponding feature 6 which runs on a server. The software defined network switches A, B may be for example open flow switches, i.e. the open flow protocol is used to control the open flow switches.

In a first step S1 the SDN controller 5 and the BGP software engine 6 exchange their initial states. In a second step S2 the SDN controller 5 instructs the SDN switch A to send all BGP packets arriving on port P1 to output them at port P2 and in a third step S3 the SDN controller 5 instructs the SDN switch B to forward all incoming BGP related packets on port P3 to output them on port P4. The software defined network switch B is in FIG. 4 directly connected to the server and the SDN switch A is indirectly connected to the server via SDN switch B.

In the initial request from the BGP software engine 6 to the controller 5 according to step S1 information preferably which packet header will be evaluated by the BGP software engine 6 and which additional information is required by the BGP software engine 6 is included. For the BGP software engine 6 for example the switch identifier and the switch port number are needed by the BGP software engine 6 for correctly processing BGP control packets and are encoded in the corresponding control packets. This may be performed for example by using unused header fields or by adding further headers.

When in a fourth step S4 BGP control packets now arrive at any of the configured software defined networks switches A, B they are forwarded to the server in which the BGP software engine 6 is running. The server then transmits the BGP control packets in a fifth step S5 to the BGP software engine 6 for processing. In a sixth step S6 the BGP control packets are processed by the BGP software engine 6 and a response is if necessary sent back to the server (step S7) and further in an eighth step S8 via the software defined network switches A, B back to the external router. In a ninth step S9 the BGP software engine 6 may transfer the information included in the legacy control packets to update its internal state which may be communicated in a ninth step S9 to the SDN controller 5. In a similar way if BGP packets are created by the BGP software engine 6, for example keep-alive packets, these are forwarded to the external router in the data communication plane.

Figure 5:
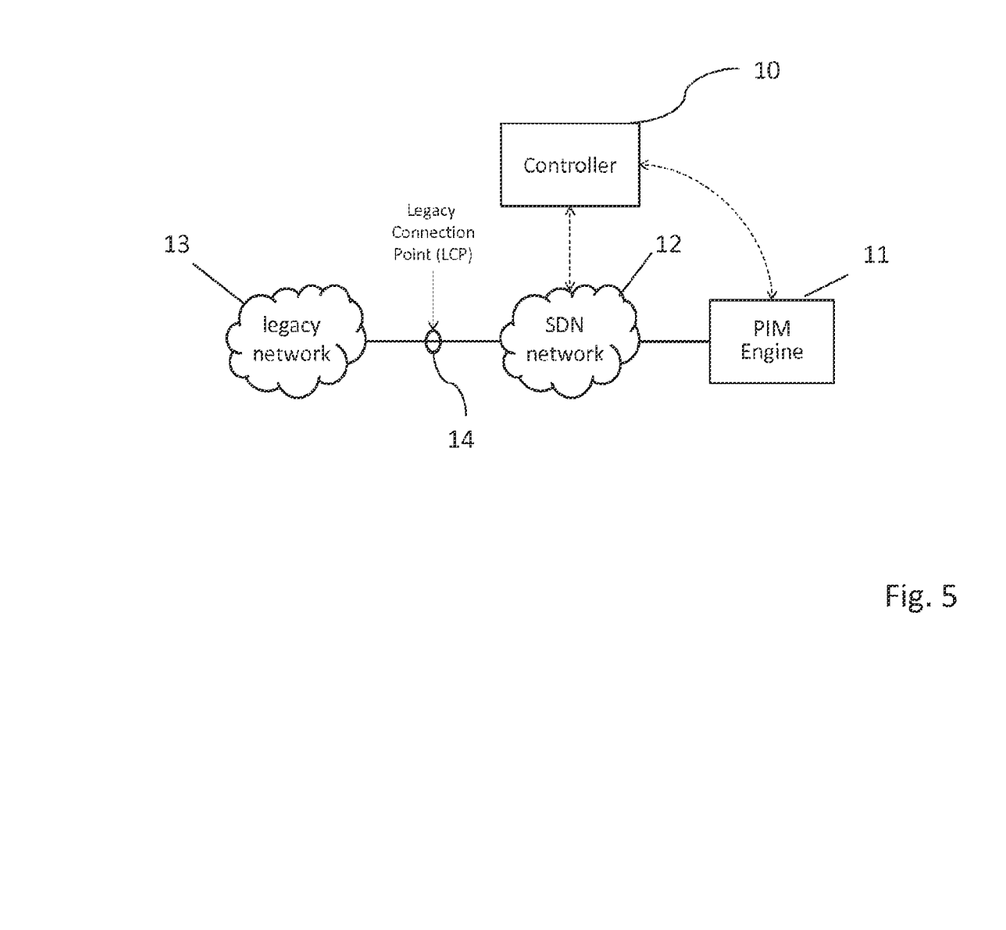
FIG. 5 depicts a system according to a fourth embodiment of the present invention.

FIG. 5 shows a system according to a fourth embodiment of the present invention. In FIG. 5 a software defined network 2 based on protocol-independent multicast-space mode PIM-SM according to RFC 4601 is shown. PIM-SM is used to create multicast distribution trees in routed networks. Signaling between multicast end-points, i.e. senders and receivers, and a first router, i.e. the first router at the administrative boundary between the software defined network 2 and a legacy network is handled using internet group management protocol IGMP and PIM is used between the routers inside the software defined network 2. In FIG. 5 a software defined network 12 is shown, which is connected to a PIM engine 11, i.e. a feature and a corresponding controller 10 analogue to the FIGS. 2-4.

The SDN network 12 comprises therefore routers corresponding to the SDN switches A and B in FIG. 4. The SDN network 12 is connected to a legacy network and a connection point between the SDN network 12 and the legacy network 13 is called the legacy connection point LCP 14. At the legacy connection point LCP 14 signaling messages between the two networks 12, 13 are exchanged. There might be multiple legacy connection points LCP between the two networks 12, 13. Signaling messages within the SDN network are processed by the PIM engine 11. The PIM engine 11 is connected to the SDN controller 10 via which the need for setting up network paths for PIM control messages is communicated. The PIM engine 11 needs to do group management and to keep track of end points for multicast groups.

Prior to handling or process PIM signaling a corresponding route has to be created that routes all PIM control messages from the PIM engine 11 to the legacy network 13 via the legacy connection point LCP 14. For example this may be performed by open flow by matching the packet header to the destination IP-address of a rendezvous point RP, at which multicast trees of PIM are routed. For example all PIM control packets received from senders on certain multicast addresses, for example in the IP-range 224.0.0.0/4 have to be forwarded to the PIM engine 11. This may be for example implemented by open flow rules matching on the 224.0.0.0/4 IP-range. When the PIM signaling route is established the PIM engine 11 periodically sends PIM-hello-messages to the first or border router in the legacy network 13 in order to announce the capability to process multicast traffic.

A route from the PIM engine 11 via the SDN network 12 to the legacy connection point LCP 14 matching on for example IP-address 224.0.0.13, is created at a standard of the system.

When the rendezvous point RP is located inside the legacy network, the PIM engine 11 instructs the controller 10 to add a path to the existing distribution tree for that multicast group to connect the new end point, if a new receiver joins an existing multicast group. If the receiver is the first end point in the corresponding multicast group, the controller 10 is instructed to create an initial multicast distribution tree from the legacy connection point 14 to the initial receiver. The PIM engine 11 then creates a PIM message and sends it via the PIM signaling route to the rendezvous point RP in the legacy network 13 via the legacy connection point 14. This PIM message will be re-send periodically as long as there are active receivers in the multicast group. All multicast PIM packets sent by the end points are forwarded via the SDN network 12 to the PIM engine 11. The PIM engine 11 then encapsulates the packets as PIM register messages and sends them via the PIM signaling route to the rendezvous point in the legacy network 13. If a particular multicast group is empty, i.e. all receivers have left the group, a PIM prune message is created by the PIM engine 11 and sent to the rendezvous point RP via the legacy connection point 14.

If the rendezvous point is located inside the software defined network 12, the rendezvous point is emulated by the PIM engine 11. In the following it is assumed that the IP-address of the rendezvous point is the same as the IP-address of the PIM engine, so that PIM control messages coming in from the legacy network 13 via the legacy connection point 14 are automatically routed to the PIM engine 11. If another IP-address is used, an additional path explicitly forwarding traffic with that IP-address to the PIM engine 11 is generated. When a PIM join message is received and the legacy connection point 14 is at the moment not part of the distribution tree for the indicated multicast group or there is no tree for the multicast group, the PIM engine 11 instructs the controller 10 to add the legacy connection point 14 to the multicast tree or creates the multicast tree itself matching on the particular multicast group address.

When an encapsulated PIM data packet is received by the PIM engine 11, the PIM engine 11 encapsulates the PIM data packets and re-sends them to the distribution tree of the associated multicast group. When the PIM engine 11 receives a PIM prune message, it instructs the controller 10 to remove the legacy connection point 14 from the distribution tree of the associated multicast group.

Further the PIM engine 11 may be used to handle a switch from rendezvous point-based distribution trees to the shortest-path trees including handling and/or sending of corresponding PIM messages such as PIM join messages and PIM prune messages, source specific multicast, handling of multicast receivers within the software defined network 12 with the multicast source being in the legacy network 13, wherein the software defined network 12 appears then as a last-hop-router with regard to the legacy network 13. Further the PIM engine 11 may be used for anycast rendezvous points or rendezvous points with PIM anycast.

In a further embodiment according to the present invention the feature may be used to implement ARP protocol according to RFC 826. The network operating system or controller 5 then acts as an ARP proxy receiving all ARP requests and responds instead of the actual target hosts. The message flow for ARP is in general similar to the corresponding message flow according to FIG. 4 of the BGP protocol. The feature 6 is then represented by an ARP software engine which is started by initial state exchange between the software defined network controller 5 and the ARP software engine 6. After the initial internal state exchange, the ARP software engine 6 may work autonomously. In this mode the ARP software engine 6 will act similar to a router doing proxy ARP for hosts that are located behind this proxy. The software defined network controller 5 will then set up forwarding policies on the corresponding software defined network switches to forward all ARP requests to the ARP software engine 6. After these initial steps all ARP packets for a domain will be forwarded to the ARP software engine 6. If the ARP software engine 6 has created an entry for a request it will send a response in place of the host that was addressed. The ARP entries collected can be synchronized with the software defined network controller 5 either regularly or upon request of the software defined network controller 5. Global caching parameters may be set while the initial internal state exchange between the software defined network controller 5 and the ARP software engine 6 is done.

In summary an embodiment of the present invention enables a forwarding of legacy control protocol messages to a dedicated processing element and the dedicated process element is directly connected to the network's data path. The present invention further enables that the legacy control messages are then sent to the processing element via the data path connection, thus avoiding the indirect route via a controller's control channel.

An embodiment of the present invention enables a reduction of control channel load constituting CPU load on data forwarding elements, CPU load on the controller and control channel bandwidth by sending packets to processing elements not using the controller's control channel and by offloading packet sending/creation tasks from the controller to the processing elements. Packets are sent via the processing elements data path connection. The present invention further reduces complexity to integrate non-software defined network control features in software defined network implementations. The present invention further enables an easy exchange combination of specific feature implementations depending on situation/use-cases without having to modify and/or replace the controller(s). The present invention improves scalability by spreading processing and transmission load and enables an easier migration from legacy network into software defined networks.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for controlling an underlying physical network by a software defined network, the system comprising:
   the physical network, including a switch configured to route data traffic on a data communication plane; and
   the software defined network, including an SDN controller and a feature, wherein the feature comprises a network application built on top of the SDN controller, wherein
   the SDN controller is operable to instruct the switch to forward control packets for a non-SDN protocol to the feature via the data communication plane without encapsulating the control packets for the non-SDN protocol and to forward control packets for the SDN protocol to the SDN controller via a dedicated control channel of a control plane,
   the switch is configured to receive control packets for the non-SDN legacy protocol from an external router and to forward the received control packets for the non-SDN legacy protocol to the feature via a direct connection between the switch and the feature, and
   the feature is operable to analyze the received control packets for the non-SDN legacy protocol and transfer information included in the received control packets for the non-SDN legacy protocol to the SDN controller via a dedicated feature channel between the feature and the SDN controller.

2. The system of claim 1, wherein the direct interface in the data communication plane between the at least one feature and the data forwarding elements does not utilize bandwidth of either the dedicated control channel or the dedicated feature channel.

3. A method for processing, by a software-defined network (SDN), control packets for a non-SDN legacy protocol and control packets for an SDN protocol, wherein the SDN includes a switch, a feature, and an SDN controller, wherein the feature comprises a network application built on top of the SDN controller, the method comprising:

instructing, by the SDN controller, the switch to forward the control packets for the non-SDN legacy protocol to the feature via a data communication plane without encapsulating the control packets for the non-SDN legacy protocol into control packets for the SDN protocol, and to forward the control packets for the SDN protocol to the SDN controller via a control plane, receiving, at the switch, the control packets for the non-SDN legacy protocol from an external router, forwarding, by the switch, the control packets for the non-SDN legacy protocol to the feature via a direct connection between the switch and the feature, analyzing, by the feature, the control packets for the non-SDN legacy protocol, transferring, by the feature, information included in the control packets for the non-SDN legacy protocol to the SDN controller via a dedicated feature channel between the feature and the SDN controller, and forwarding, by the switch, the control packets for the SDN protocol to the SDN controller via a dedicated control channel of the control plane, where the dedicated control channel has a lower bandwidth than the direct connection.

4. The method according to claim 3, wherein the SDN controller and the feature are collocated at a same entity in the physical network.

5. The method according to claim 3, wherein the SDN controller and/or the feature are distributed on different entities of the physical network.

6. The method according to claim 3, wherein OpenFlow protocol is used as an SDN control protocol for controlling the switch by the SDN.

7. The method according to claim 3, further comprising identifying, by the SDN controller, forwarding information for the non-SDN legacy protocol.

8. The method according to claim 7, wherein the forwarding information is at least one of:
   encoded into unused headers of the control packets for the non-SDN legacy control protocol, and/or
   included in further headers of the control packets for the non-SDN legacy control protocol generated to include the forwarding information.

9. The method according to claim 3, wherein forwarding information is removed from the control packets for the non-SDN legacy protocol prior to arrival of the control packets for the non-SDN legacy protocol at the at least one feature.

10. The method according to claim 3, further comprising emulating, by the feature, at least one of unicast or multicast non-SDN legacy protocols.

11. The method according to claim 3, wherein the feature includes an incoming feature and an outgoing feature, the method further comprising:
   receiving, by the incoming feature, data control traffic; and
   instructing, by the incoming feature, the outgoing feature to output further data control traffic based on the received data control traffic.

12. The method of claim 10, wherein the unicast or multicast non-SDN legacy protocol is emulated by the feature in the form of at least one of BGP, PIM, ARP, STP, and IGMP.

13. The method of claim 3, wherein the direct interface in the data communication plane between the at least one feature and the data forwarding elements does not utilize bandwidth of either the dedicated control channel or the dedicated feature channel.

* * * * *